(12) United States Patent
Hassan et al.

(10) Patent No.: US 6,899,302 B1
(45) Date of Patent: May 31, 2005

(54) METHOD AND DEVICE FOR ALTERING THE SEPARATION CHARACTERISTICS OF FLOW OVER AN AERODYNAMIC SURFACE VIA HYBRID INTERMITTENT BLOWING AND SUCTION

(75) Inventors: Ahmed A. Hassan, Mesa, AZ (US);
Ram D. JanakiRam, Mesa, AZ (US);
Dino A. Cerchie, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/734,565

(22) Filed: Dec. 12, 2003

(51) Int. Cl.$^7$ .......................... B64C 21/04; B64C 21/06
(52) U.S. Cl. .................................... 244/208; 244/130
(58) Field of Search ........................ 244/130, 199, 244/207, 208, 209

(56) References Cited

U.S. PATENT DOCUMENTS

| | | | |
|---|---|---|---|
| 2,545,010 A | * 3/1951 | Stalker | ................ 244/208 |
| 4,382,569 A | * 5/1983 | Boppe et al. | ................ 244/199 |
| 5,054,720 A | 10/1991 | Page | |
| 5,938,404 A | 8/1999 | Domzalski et al. | |
| 6,092,990 A | 7/2000 | Hassan et al. | |
| 6,135,395 A | * 10/2000 | Collett | ................ 244/209 |
| 6,234,751 B1 | 5/2001 | Hassan et al. | |
| 6,302,360 B1 | 10/2001 | Ng | |
| 6,471,477 B2 | 10/2002 | Hassan et al. | |
| 6,543,719 B1 | 4/2003 | Hassan et al. | |

* cited by examiner

Primary Examiner—Robert P. Swiatek
(74) Attorney, Agent, or Firm—Thompson Coburn LLP

(57) ABSTRACT

An active flow control device and method for improving the aerodynamic efficiency of airfoils. The device and method pertain to the application of hybrid intermittent suction or intake of low-energy boundary layer fluid into an airfoil through one or more inlet openings while also applying intermittent blowing or expulsion of fluid out of such an airfoil into the boundary layer through one or more outlet openings for the purpose of delaying or eliminating boundary layer separation.

20 Claims, 4 Drawing Sheets

METHOD AND DEVICE FOR ALTERING THE SEPARATION CHARACTERISTICS OF FLOW OVER AN AERODYNAMIC SURFACE VIA HYBRID INTERMITTENT BLOWING AND SUCTION

BACKGROUND OF THE INVENTION

The aerodynamic performance, hence efficiency, of airfoils, rotor blades, wings, turbine/compressor blades, and windmill blades, is strongly dependent upon the lift-to-drag (L/D) ratio of such airfoils. To this end, active flow control (AFC) techniques have been utilized to increase the L/D ratio. These AFC techniques include providing ports and/or openings through the surface of such airfoils and applying steady blowing, steady suction, or alternating blowing and suction of fluid therefrom. Such AFC techniques have proven to be effective in increasing the lift coefficient of airfoils, decreasing their drag coefficient, or both in a manner that increases the overall L/D ratio of the airfoils, and thereby increasing their aerodynamic efficiency.

AFC techniques are particularly advantageous in situations where large flow separations over such airfoils would otherwise exist. Such situations frequently occur when airfoils are orientated at high angles-of-attack and when flaps are utilized to generate relatively high lift. As is the case with virtually all types of aerodynamic control surfaces, a drag penalty is usually incurred when fluid flow over the top surface (or the lower pressure surface) of the airfoil separates upstream of the trailing edge of the airfoil. The size of the separated flow region forward of the trailing edge depends on, among other things, the free stream angle-of-attack, the flow speed, the airfoil cord length, and, for flapped airfoils, the flap chord length and the flap deflection angle. Additionally, such separation is accompanied by a detrimental recirculation flow region downstream of the separation point. By reducing or delaying flow separation, a corresponding increase in lift and/or reduction in drag can be achieved.

SUMMARY OF THE INVENTION

The present invention pertains to an AFC technique of applying intermittent suction or intake of fluid, in combination with intermittent blowing or expulsion of fluid, through the exterior surface of an airfoil in a manner reducing or delaying flow (laminar or turbulent) separation over the airfoil. This technique requires less power than is required with constant suction or constant blowing AFC techniques and provides for a greater increase in lift-to-drag ratios as compared to oscillating suction/expulsion or intermittent suction only AFC methods.

In a first aspect of the invention, a device comprises an airfoil, a fluid (gas or liquid) inlet opening, a fluid outlet opening, a pump, and first and second valves. The airfoil has an exterior surface and the fluid inlet and outlet openings each extend through the exterior surface of the airfoil. The pump is operatively connected to the fluid inlet opening and to the fluid outlet opening, and is configured and adapted to draw fluid into the airfoil through the fluid inlet opening and to expel fluid from the airfoil through the fluid outlet opening. The first valve is operatively connected between the fluid inlet opening and the pump and the second valve is operatively connected between the pump and the fluid outlet opening. The first valve is configured and adapted to allow fluid to be drawn into the airfoil through the fluid inlet opening via the pump and to prevent fluid from being expelled from the airfoil through the fluid inlet opening. The second valve is configured and adapted to allow fluid to be expelled from the airfoil through the fluid outlet opening via the pump and to prevent fluid from being drawn into the airfoil through the fluid outlet opening.

In a second aspect of the invention, a method comprises the step of providing an apparatus having an airfoil and first and second valves. The airfoil has an exterior surface, a fluid inlet opening, and a fluid outlet opening. The fluid inlet and outlet openings each extend through the exterior surface of the airfoil. The method further comprises intermittently drawing fluid into the airfoil from an environment external to the apparatus via the fluid inlet opening in manner defining a plurality of intake time intervals separated by a plurality of non-intake time intervals. Additionally, the method comprises utilizing the first valve to prevent expulsion of fluid from the airfoil via the fluid inlet opening during the non-intake intervals. The method also comprises intermittently expelling fluid from the airfoil into the external environment via the fluid outlet opening in a manner defining a plurality of expulsion time intervals separated by a plurality of non-expulsion time intervals. Yet further, the method comprises utilizing the second valve to prevent fluid from entering the airfoil via the fluid outlet opening during the non-expulsion intervals.

In a third aspect of the invention, a method comprises the step of providing an apparatus having an airfoil, fluid inlet and fluid outlet openings, and a valve. The airfoil has an exterior surface and a fluid passageway and the fluid inlet and outlet openings each extend through the exterior surface of the airfoil. The valve is movable between opened and closed positions and is configured and adapted to prevent fluid from flowing through the fluid inlet opening when in its closed position and to allow fluid to flow through the fluid inlet opening when in its opened position. The method also comprises the step of drawing fluid into the fluid passageway of the airfoil from an environment external to the apparatus via the fluid inlet opening. The drawing of fluid into the fluid passageway via the fluid inlet opening occurs with the valve in its opened position. The method further comprises the step of expelling fluid from the fluid passageway of the airfoil into the external environment via the fluid outlet opening. The expelling of fluid from the fluid passageway via the fluid outlet opening occurs with the valve in its closed position.

While the principal advantages and features of the invention have been described above, a more complete and thorough understanding of the invention may be obtained by referring to the drawings and the detailed description of the preferred embodiments which follow.

Figure 1:
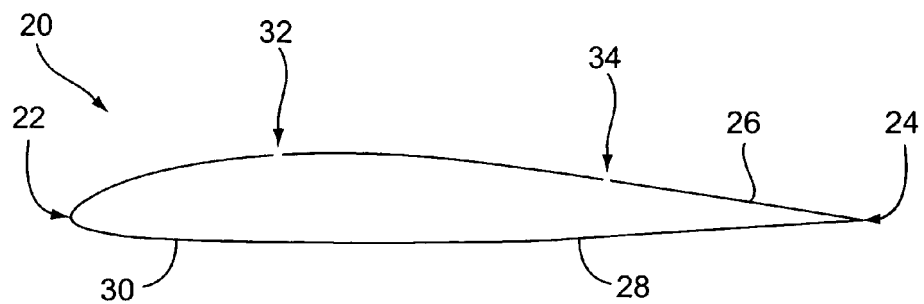
FIG. 1 depicts an airfoil utilized in connection with the preferred method of practicing the invention.

Reference numerals in the written specification indicate corresponding items shown throughout the drawing figures.

DETAILED DESCRIPTION OF THE PREFERRED EMBODIMENT OF THE INVENTION

For purposes of testing the preferred method of practicing the invention, a 12% thick VR-7 airfoil having a 4% tailing edge tab was utilized. As shown in FIG. 1, this airfoil 20 has a leading edge 22 and a trailing edge 24 that separate opposite top 26 and bottom 28 portions of the exterior surface 30 of the airfoil. The leading 22 and trailing 24 edges also define a chord length that extends therebetween. It should be appreciated that this particular airfoil 20 is merely an exemplary airfoil and that the invention can be utilized on various types of airfoils, with or without movable control surfaces such a flaps. Moreover, it should be appreciated that the invention can be utilized in connection with airfoils on various types of devices, including, but not limited to, fan blades, turbine blades, aircraft wings, and aircraft rotor blades.

The AFC technique of the present invention is of particular benefit in situations or conditions where premature separation of fluid flow over an airfoil occurs absent the use of an AFC technique. Thus, for comparison purposes, the test airfoil 20 was assumed to be moving relative to a fluid in a manner that would cause flow separation forward of the trailing edge 24 under non-AFC conditions. In particular, the Reynolds Number was assumed to be approximately 2.4 million, and it was assumed that the airfoil was moving through air at a free stream Mach Number of 0.30 and at a free stream (onset flow) angle-of-attack of 15 degrees. Based on analysis of the non-AFC flow around the airfoil 20 under these conditions using commercially available computational fluid dynamics analysis tools, it was determined that undesirable flow separation would exist.

Using similar computational fluid dynamics tools to analyze the benefits of the AFC technique of the present invention under identical conditions, intermittent suction (fluid intake) was introduced through the top portion 26 of the exterior surface 30 of the airfoil 20 at approximately 30% of the chord length from the leading edge 22. This location was chosen to be such that the intermittent suction is introduced slightly aft of where the flow separation commences under non-AFC, but otherwise identical, flow conditions. Additionally, intermittent blowing of fluid (fluid expulsion) was introduced through the top portion 26 of the exterior surface 30 of the airfoil 20 at approximately 74% of the chord length from the leading edge 22. This location of fluid expulsion was found to be ideal for the particular airfoil 20 under the particular flow parameters, by way of trial-and-error calculations.

Figure 2:
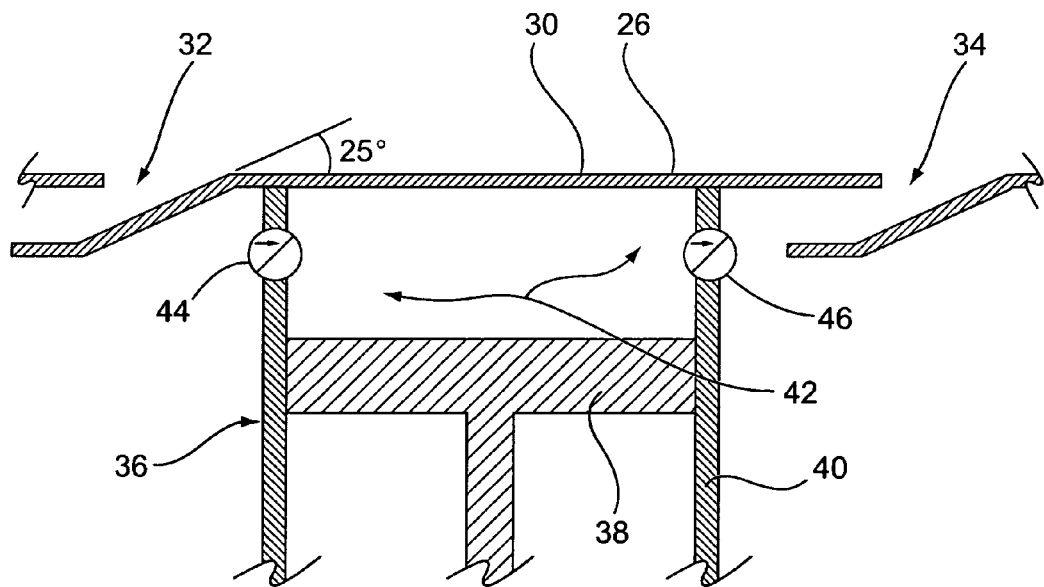
FIG. 2 is a schematic representation of a partial cross-sectional view of the airfoil shown in FIG. 1 and depicts a pump and valve arrangement for practicing the invention.

The intermittent suction was applied at a frequency of 350 Hertz and at a peak suction Mach Number (Mjet or Mj) of 0.30. In the preferred method of practicing the invention, air is drawn through the top portion 26 of the exterior surface 30 of the airfoil 20 via an inlet slot 32 that forms a fluid inlet opening, as shown in FIG. 2. The slot 32 preferably has a nondimensional width of 0.0035 (i.e., the slot width divided by airfoil chord length) and is configured and adapted to draw air in at an angle of approximately 25 degrees relative to the local surface tangent of the surrounding exterior surface 30 of the airfoil 20 (mainly from the trailing edge 24 direction of the airfoil).

In a similar manner, the intermittent fluid expulsion was applied at a frequency of 350 Hertz and at a peak blowing Mach Number (Mjet or Mj) of 0.30. In the preferred method of practicing the invention, air is expelled through the top portion 26 of the exterior surface 30 of the airfoil 20 via a slot 34 that forms a fluid outlet opening and that is similar to the slot 32 that forms the fluid inlet opening.

The partial vacuum pressure required to draw air into the airfoil 20 through the inlet slot 32 can be achieved by various devices and techniques know in the art. Preferably, a pump placed within airfoil is operatively connected to the slot 32 for such purposes. For illustrative purposes, a simplified schematic representation of a pump, valve, and slot assembly is shown in FIG. 2. The pump 36 preferably comprises a linearly reciprocating piston 38 that moves relative to a cylinder wall 40 in a manner periodically increasing and decreasing the volume of a fluid chamber 42. However, it should be appreciated various other devices or methods, including non-reciprocating pumps such as centrifugal or radial flow pumps, could be used as alternatives to a linearly reciprocating pump. Nonetheless, in the preferred embodiment of the invention, the piston 38 of the pump 36 is linearly reciprocated via a conventional electromagnetically driven actuator such as a voice-coil (not shown).

The assembly also preferably comprises first and second valves 44,46 (shown schematically). The first valve 44 is operatively connected between the fluid chamber 42 and the inlet slot 32 and is movable between opened and closed positions. With the first valve 44 in its opened position, the fluid chamber 42 is in fluid communication with the fluid environment surrounding the airfoil via the inlet slot 32. Conversely, fluid communication between the fluid chamber 42 and the external environment via the inlet slot 32 is prevented when the first valve 40 is in its closed position.

For efficiency purposes, it is desirable to have the intermittent fluid expulsion from the outlet slot 34 driven by the same pump that drives the intermittent fluid intake through the inlet slot 32. As such, the second valve 46 is operatively connected between the fluid chamber 42 and the outlet slot 34. Similar to the first valve 44 the second valve 46 is movable between opened and closed positions. With the second valve 46 in its opened position, the fluid chamber 42 is in fluid communication with the fluid environment surrounding the airfoil via the fluid outlet slot 34. In its closed position, the second valve 46 prevents fluid from flowing from the fluid chamber 42 through the outlet slot 34. The first 44 and second 46 valves can be actuated between their opened and closed positions via electronic solenoids, commercially available vibration shakers, linear motors, mechanical cams, or other suitable force generating devices, or can be by one-way check valves that are actuated merely by pressure differentials acting between opposite ports of each valve. One-way check valves are preferred since they require no control signal inputs and automatically synchronize.

In operation, as the piston 38 moves relative to the cylinder wall 40 in a manner increasing the volume of the fluid chamber 42, the first valve 44 is preferably in its opened position and the second valve 46 is preferably in its closed position. This creates a partial vacuum within the fluid chamber 42 and acts to draw or suck low-energy boundary layer fluid from the external environment surrounding the airfoil 20 through the inlet slot 32. After a time interval of intake has occurred, the first valve 44 is preferably moved to its closed position and the second valve 46 is preferably moved to its opened position. This movement preferably occurs automatically as a result of an increase of pressure in the fluid chamber 42 caused by the piston 38 switching its direction of movement relative to the cylinder wall 40 in a manner decreasing the volume of the fluid chamber 42.

As the volume of the fluid chamber 42 decreases, some fluid within the airfoil 20 is forced through the second valve 46 and out of the airfoil through the outlet slot 34. During this time period of fluid expulsion, intake of fluid into the airfoil 20 via the intake slot 32 is prevented as a result of the first valve 44 being in its closed position. However, it should be appreciated that this would not necessarily be the case if separate pumps were utilized to move fluid through the inlet 32 and outlet 34 slots.

After a time interval of fluid expulsion occurs, the piston 38 of the pump 36 once again switches direction in manner causing the volume of the fluid chamber 42 to increase. The resulting decrease in pressure within the fluid chamber 42 preferably automatically causes the first valve 44 to move into its open position and the second valve 46 to move into its closed position. Thus, fluid is once again drawn into the airfoil 20 via the inlet slot 32.

In view of the foregoing, it should be appreciated that, as the pump 36 repetitively increases and then decreases the volume of the fluid chamber 42, a plurality of intermittent intake and non-intake time intervals occur, as do a plurality of intermittent expulsion and non-expulsion time intervals. Additionally, it should be appreciated that, the non-intake time intervals and the expulsion time intervals generally coincide, as do the intake time intervals and the non-expulsion time intervals. Moreover, it should be appreciated that the use of a reciprocating pump as described above will result in a fluid intake velocity through the inlet slot 32 that increases and then decreases (generally in a sinusoidal manner) during each intake time interval. Likewise, the expulsion velocity of fluid through the outlet slot will increase and then decrease (generally in a sinusoidal manner) during each expulsion time interval. On the other hand, if a continuous type of pump such a fan is utilized, the intake velocity and expulsion velocities may be more constant during respective intake and expulsion intervals.

In the preferred method of practicing the invention, the intake time intervals and the expulsion time intervals were set at a cycle rate of 350 Hertz. Additionally, the peak intake velocity of fluid passing through the inlet slot 32 and the peak expulsion velocity of fluid passing through the outlet slot 34 were each set at a Mach Number of 0.30.

Figure 3:
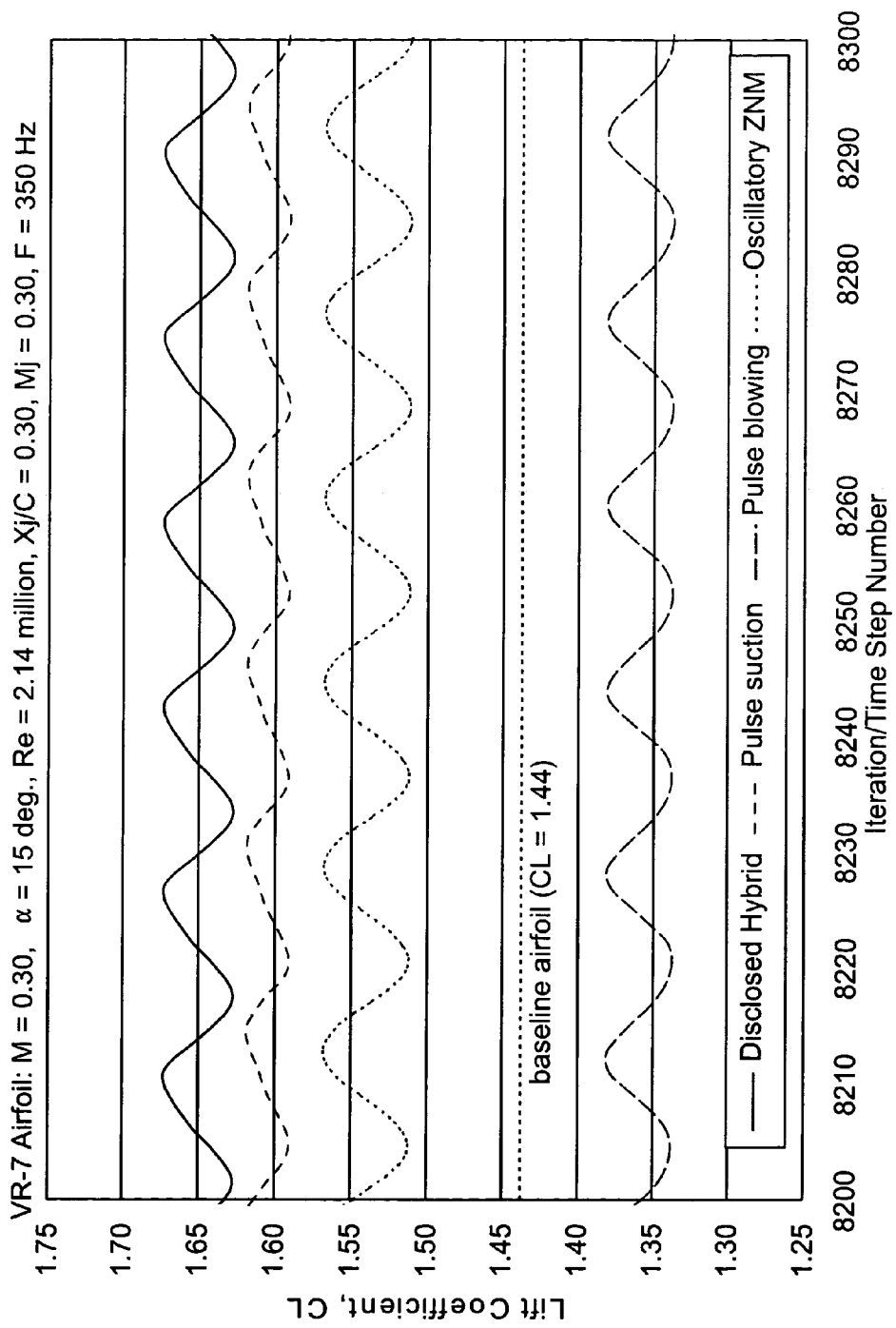
FIG. 3 is graph showing lift coefficient increases generated by utilizing the preferred method of practicing the invention as compared to lift coefficients obtained by other AFC methods.
Figure 4:
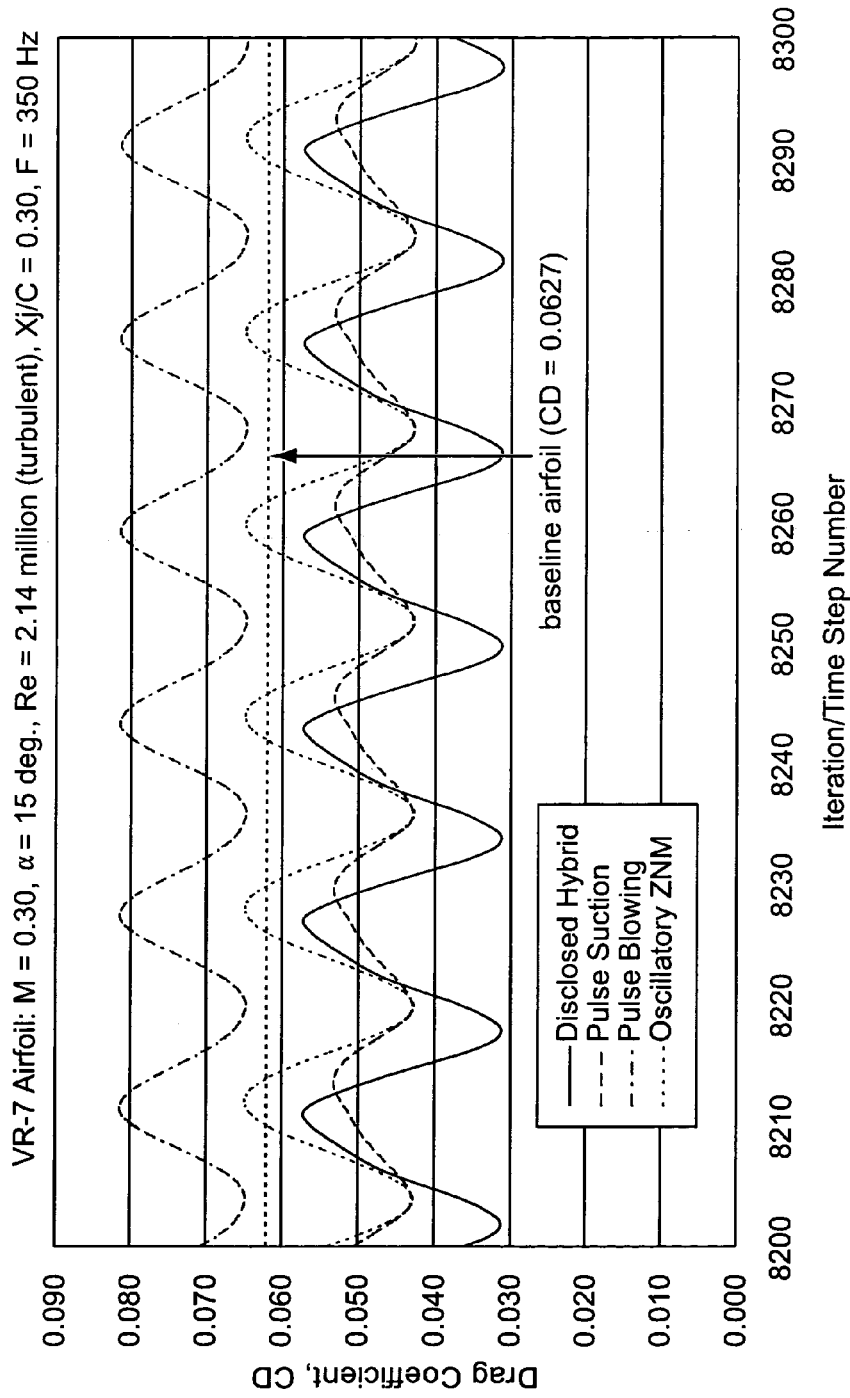
FIG. 4 is graph showing the drag coefficient decreases obtained by utilizing the preferred method of practicing the invention as compared to drag coefficients obtained by other AFC methods.
Figure 5:
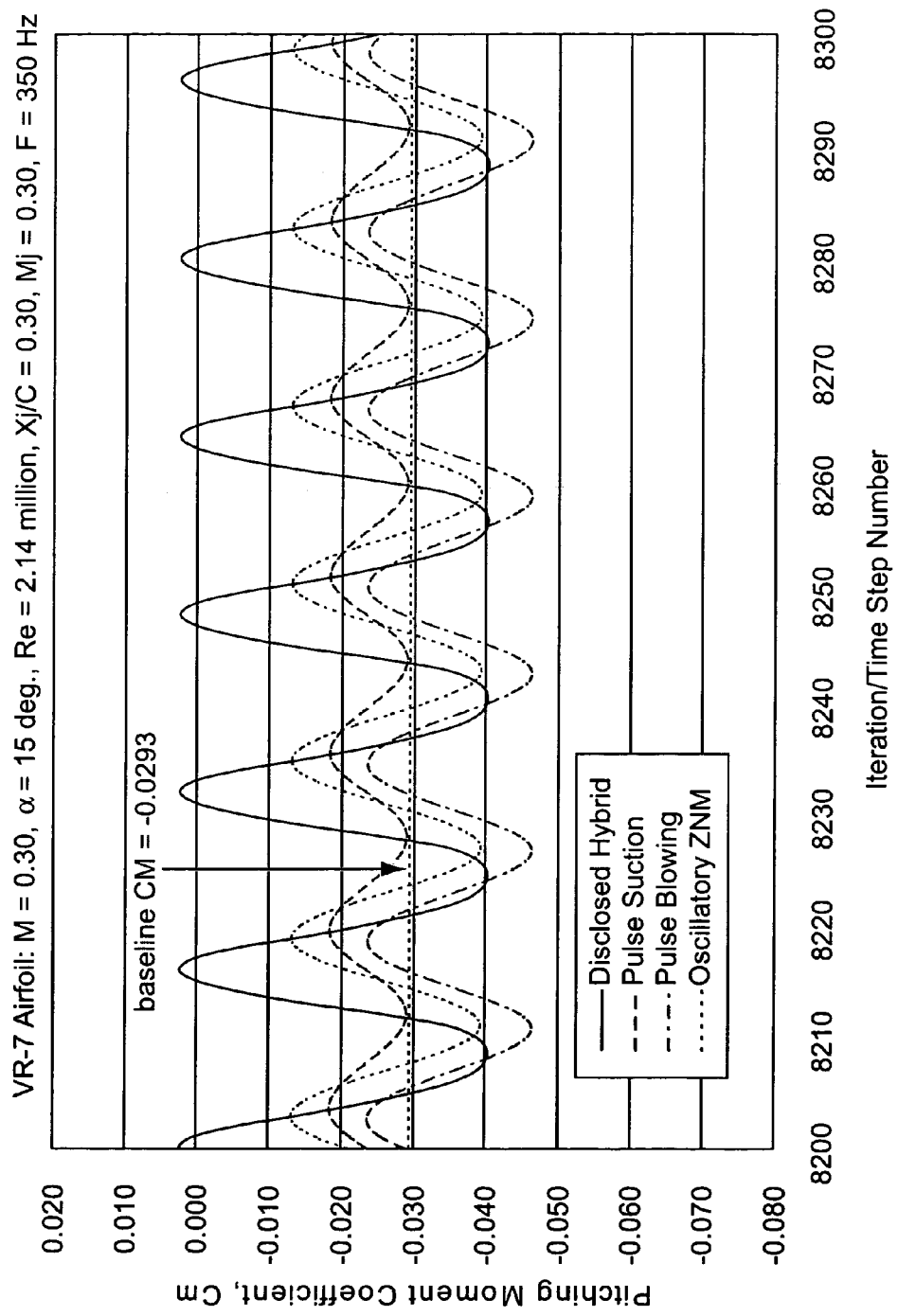
FIG. 5 is graph showing the pitching moment coefficient generated by practicing the preferred method of practicing the invention as compared to pitching moment coefficients obtained by other AFC methods.

The aerodynamic benefits achieved by the invention are shown in the graphs of FIGS. 3–5. These graphs each show aerodynamic performance results of the method of the present invention (referred to a "hybrid" AFC technique), as compared to the performance results of an intermittent or pulsed suction AFC technique, a pulsed blowing AFC technique, an oscillatory (reversing blowing and suction/zero-net-mass) AFC technique, and the non-AFC or baseline airfoil.

FIG. 3 illustrates a time history of the airfoil lift coefficient for each of the compared methods. The results for the baseline airfoil (i.e., without the use of any AFC technique) yield a mean lift coefficient of 1.44. In contrast, the hybrid AFC technique in accordance with the present invention yields a mean lift coefficient of 1.65, the pulsed suction technique yields a lift coefficient of 1.61, the oscillatory technique yields a lift coefficient of 1.53, and the pulsed blowing technique yields a lift coefficient of 1.36. Thus, the hybrid AFC technique of the present invention results in the largest enhancement (14.58°) in lift.

The drag performance results are shown in FIG. 4, which illustrates the predicted time history of the airfoil drag coefficient for the various methods. The baseline (non-AFC controlled) airfoil yields a mean drag coefficient of 0.0627. In contrast, the mean drag coefficient yielded by the various AFC techniques are as follows: 0.0743 for the pulsed blowing AFC technique; 0.0526 for the oscillatory AFC technique; 0.0482 for the pulsed suction AFC technique; and only 0.0451 for the hybrid AFC technique of the present invention. These results indicate that the use of the hybrid technique of the present invention provides for the largest reduction in sectional drag (28.1°).

Combining the lift and drag results, the approximate L/D ratios resulting from the various AFC techniques are: 18.3 for the pulsed blowing technique; 29.1 for the oscillatory technique; 33.4 for the pulsed suction technique; and 36.58 for the hybrid technique of the present invention. In contrast, the baseline airfoil has a L/D ratio of only 22.9. From these results, it should be appreciated that the intermittent AFC technique of the present invention is capable of achieving a lift-to-drag ratio that is approximately 1.6 times that of the uncontrolled baseline airfoil under similar conditions. This significant enhancement in the airfoil's L/D ratio is a direct consequence of the reduction in drag and the increase in airfoil lift due to the application of intermittent suction and blowing from the separate fluid inlet and outlet openings.

The impact of the various AFC techniques on the pitching moment coefficients for the test airfoil are shown in FIG. 5. As can be seen from this figure, the pulsed blowing AFC technique produces the largest negative mean pitching moment coefficient of −0.0324, while the hybrid technique of the present invention produces the smallest negative mean pitching moment coefficient of −0.0185. The other techniques yield −0.0243 for the pulsed suction AFC technique, −0.0270 for the oscillatory AFC technique, and −0.0293 for the baseline non-AFC technique. Hence, it should be appreciated that the hybrid AFC technique of the present invention appreciably reduces the magnitude of the airfoil pitching moment, which in most cases is advantageous.

In view of the foregoing, it should be appreciated that the hybrid AFC technique of the present invention enhances the aerodynamic performance of airfoils (aerodynamic surfaces) by providing increases in lift that are simultaneously accompanied by reductions in drag. This is primarily a consequence of the intermittent suction through the inlet opening or openings acting to decrease the thickness of the boundary layer in a manner moving the point of flow separation aft with respect to the airfoil's leading edge. Additionally, the intermittent blowing or expulsion from the outlet opening or openings downstream of the inlet opening(s) beneficially alters the recirculation flow pattern in the separated flow region. In particular, the expulsion of fluid from the outlet opening(s) divides the otherwise detrimental flow circulation pattern near the airfoil's trailing edge into two counter-rotating circulation regions, thereby reversing the flow circulation direction upstream of the outlet opening(s). This reversed flow circulation acts to further decrease the size of the separated flow region and thereby further increases lift and reduces drag. Thus, the use of present invention to control/postpone boundary layer separation translates into significantly higher lift-to-drag ratios and more efficient aerodynamic components, and, as a result, more efficient vehicle or device configurations.

In view of the forgoing, many advantages of the preferred method of practicing the invention should be appreciated. However, it should be understood that all matter contained in the above description or shown in the accompanying drawing is intended to be interpreted as illustrative and not in a limiting sense and that various modifications and variations to the preferred method may be employed without departing from the scope of the invention defined by the following claims. For example, it should be appreciated that, as discussed above, separate pumps, fans, or other suitable devices could be utilized such that the inlet opening(s) need not necessarily be operatively connected to the outlet opening(s). Moreover, not all of the steps of the preferred method of practicing the invention need to be performed, nor need to be performed in any particular order, to practice the claimed invention. Still further, it should be appreciated that the frequency, placement, jet velocity, size, and number of the inlet and outlet openings can be altered to suit any airfoil configuration under any desired conditions. Thus, other possible variations and modifications of the preferred method should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, to the extent the term "portion" is used in the claims or is added by amendment, such term should be construed as meaning some or all of the item or element that it qualifies.

What is claimed is:

1. An apparatus comprising:
   an airfoil having an exterior surface;
   a fluid inlet opening extending through the exterior surface of the airfoil;
   a fluid outlet opening extending through the exterior surface of the airfoil;
   a pump operatively connected to the fluid inlet opening and to the fluid outlet opening, the pump being configured and adapted to draw fluid into the fluid inlet opening and to expel fluid from the fluid outlet opening; and
   first and second valves, the first valve being operatively connected between the fluid inlet opening and the pump and the second valve being operatively connected between the pump and the fluid outlet opening, the first valve being configured and adapted to allow fluid to be drawn into the airfoil through the fluid inlet opening via the pump and to prevent fluid from being expelled from the airfoil through the fluid inlet opening, the second valve being configured and adapted to allow fluid to be expelled from the airfoil through the fluid outlet opening via the pump and to prevent fluid from being drawn into the airfoil through the fluid outlet opening.

2. An apparatus in accordance with claim 1 wherein the apparatus is an aircraft that comprises a wing, and wherein the airfoil constitutes a portion of the wing.

3. An aircraft in accordance with claim 2 wherein the wing has a leading edge and a trailing edge that define opposite top and bottom portions of the exterior surface of the airfoil, and wherein the fluid inlet opening and the fluid outlet opening each extend through the top portion of the exterior surface of the airfoil.

4. An aircraft in accordance with claim 3 wherein the fluid inlet opening is positioned between the leading edge of the wing and the fluid outlet opening.

5. An apparatus in accordance with claim 1 wherein the first and second valves are one-way check valves.

6. A apparatus in accordance with claim 1 wherein the pump comprises a member that partially bounds a fluid chamber and that is configured and adapted to reciprocate in a manner so as to increase and decrease the volume of the fluid chamber.

7. A method comprising:
   providing an apparatus that comprises an airfoil and first and second valves, the airfoil having an exterior surface, a fluid inlet opening, and a fluid outlet opening, the fluid inlet and outlet openings each extending through the exterior surface of the airfoil;
   intermittently drawing fluid into the airfoil from an environment external to the apparatus via the fluid inlet opening in manner defining a plurality of intake time intervals separated by a plurality of non-intake time intervals;
   utilizing the first valve to prevent expulsion of fluid from the airfoil via the fluid inlet opening during the non-intake intervals;
   intermittently expelling fluid from the airfoil into the external environment via the fluid outlet opening in a manner defining a plurality of expulsion time intervals separated by a plurality of non-expulsion time intervals; and
   utilizing the second valve to prevent fluid from entering the airfoil via the fluid outlet opening during the non-expulsion intervals.

8. A method in accordance with claim 7 wherein the steps of intermittently drawing fluid into the airfoil and intermittently expelling fluid from the airfoil occur in a manner such that the intake time intervals coincide with the non-expulsion time intervals and such that the non-intake time intervals coincide with the expulsion time intervals.

9. A method in accordance with claim 7 wherein the step of providing the apparatus occurs in a manner such that the apparatus further comprises a pump that is operatively connected to the fluid inlet opening and to the fluid outlet opening, and wherein the method further comprises utilizing the pump to perform the steps of intermittently drawing fluid into the airfoil from the external environment via the fluid inlet opening and intermittently expelling fluid from the airfoil into the external environment via the fluid outlet opening.

10. A method in accordance with claim 9 wherein the step of providing the apparatus occurs in a manner such that the pump comprises a member that partially bounds a fluid chamber, and wherein the step of utilizing the pump to perform the steps of intermittently drawing fluid into the airfoil from the external environment via the fluid inlet opening and intermittently expelling fluid from the airfoil into the external environment via the fluid outlet opening comprises reciprocating the member of the pump in a manner causing the volume of the fluid chamber to increase and then decrease in a repetitive manner.

11. A method in accordance with claim 7 wherein the step of intermittently drawing fluid into the airfoil from an environment external to the apparatus via the fluid inlet opening occurs in a manner such that at least one-hundred intake time intervals occur within one second.

12. A method in accordance with claim 7 wherein the step of providing the apparatus occurs in a manner such that the airfoil has a leading edge and a trailing edge that define opposite top and bottom portions of the exterior surface of the airfoil, and wherein the steps of intermittently drawing fluid into the airfoil and intermittently expelling fluid from the airfoil occur in a manner such that fluid is drawn into and expelled through the top portion of the exterior surface of the airfoil.

13. A method in accordance with claim 12 wherein the step of providing the apparatus occurs in a manner such that the fluid inlet opening is positioned between the leading edge of the airfoil and the fluid outlet opening.

14. A method comprising:
providing an apparatus having an airfoil, separate fluid inlet and fluid outlet openings, and a valve, the airfoil having an exterior surface and a fluid passageway, the fluid inlet opening and the fluid outlet opening each extending through the exterior surface of the airfoil, the valve being movable between opened and closed positions, the valve being configured and adapted to prevent fluid from flowing through the fluid inlet opening when in its closed position and to allow fluid to flow through the fluid inlet opening when in its opened position;
drawing fluid into the fluid passageway of the airfoil from an environment external to the apparatus via the fluid inlet opening, the drawing of fluid into the fluid passageway via the fluid inlet opening occurring with the valve in its opened position;
expelling fluid from the fluid passageway of the airfoil into the external environment via the fluid outlet opening, the expelling of fluid from the fluid passageway via the fluid outlet opening occurring with the valve in its closed position.

15. A method in accordance with claim 14 wherein the step of providing the apparatus occurs in a manner such that the valve constitutes a first valve and wherein the such that the apparatus further comprises a second valve, the second valve being movable between opened and closed positions and being configured and adapted to prevent fluid from flowing through the fluid outlet opening when in its closed position and to allow fluid to flow through the fluid outlet opening when in its opened position, the step of drawing fluid into the fluid passageway occurring with the second valve in its closed position and the step of expelling fluid from the fluid passageway occurring with the second valve in its opened position.

16. A method in accordance with claim 15 further comprising a step of cycling each of the first and second valves between their opened and closed positions at a rate of at least one-hundred Hertz.

17. A method in accordance with claim 16 wherein the step of cycling each of the first and second valves between their opened and closed positions is performed by creating pressure differentials that cause the first and second valves to move between their opened and closed positions.

18. A method in accordance with claim 14 wherein the step of providing the apparatus occurs in a manner such that the apparatus further comprises a reciprocating member, and wherein the steps of drawing fluid into the fluid passageway and expelling fluid from the fluid passageway occur via reciprocation of the reciprocating member.

19. A method in accordance with claim 14 wherein the apparatus is an aircraft and wherein the step of providing the aircraft occurs in a manner such that the airfoil has a leading edge and a trailing edge that define opposite top and bottom portions of the exterior surface of the airfoil, and wherein the steps of drawing fluid into the fluid passageway and expelling fluid from the fluid passageway occur in a manner such that fluid is drawn into and expelled through the top portion of the exterior surface of the airfoil.

20. A method in accordance with claim 19 wherein the step of providing the aircraft occurs in a manner such that the fluid inlet opening is positioned between the leading edge of the airfoil and the fluid outlet opening.

\* \* \* \* \*